United States Patent [19]
Foley et al.

[11] Patent Number: 5,193,384
[45] Date of Patent: Mar. 16, 1993

[54] EDGE DETECTING SYSTEM AND METHOD

[75] Inventors: Michael F. Foley, Cambridge; Kurt E. Guggenberger, Burlington, both of Mass.

[73] Assignee: The Charles Stark Draper Laboratory, Inc., Cambridge, Mass.

[21] Appl. No.: 589,086

[22] Filed: Sep. 26, 1990

[51] Int. Cl.⁵ ............................................. G01B 5/28
[52] U.S. Cl. ..................................................... 73/105
[58] Field of Search .................................. 73/104, 105

[56] References Cited

U.S. PATENT DOCUMENTS

| | | | |
|---|---|---|---|
| 2,405,133 | 8/1946 | Brown | 73/105 |
| 4,103,542 | 8/1978 | Wheeler et al. | 73/105 |
| 4,669,300 | 6/1987 | Hall et al. | 73/105 |
| 4,776,212 | 10/1988 | Parsons et al. | 73/105 |
| 4,987,303 | 1/1991 | Takase et al. | 73/105 |

FOREIGN PATENT DOCUMENTS 564209  9/1944  United Kingdom ................ 73/105
606152  8/1948  United Kingdom ................ 73/105

Primary Examiner—Robert Raevis
Attorney, Agent, or Firm—Iandiorio & Dingman

[57] ABSTRACT

An edge detecting system for detecting an edge on a wavy surface includes a stylus for tracking across the surface; a transducer, responsive to the stylus, for producing a signal representative of surface transitions sensed by the stylus; a support for suspending the stylus over the surface with the stylus contacting the surface in which the support has a natural frequency which isolates the stylus from the low-frequency wavy surface contours and compels the stylus to respond only to the higher frequency surface transitions. Further included is a detector, responsive to the transducer, for detecting a signal representative of an edge amidst other high-frequency surface transitions. Also disclosed is a system in which the signal of the transducer is averaged and then compared to a reference level to determine the orientations of the fibers in the material of the surface.

18 Claims, 7 Drawing Sheets

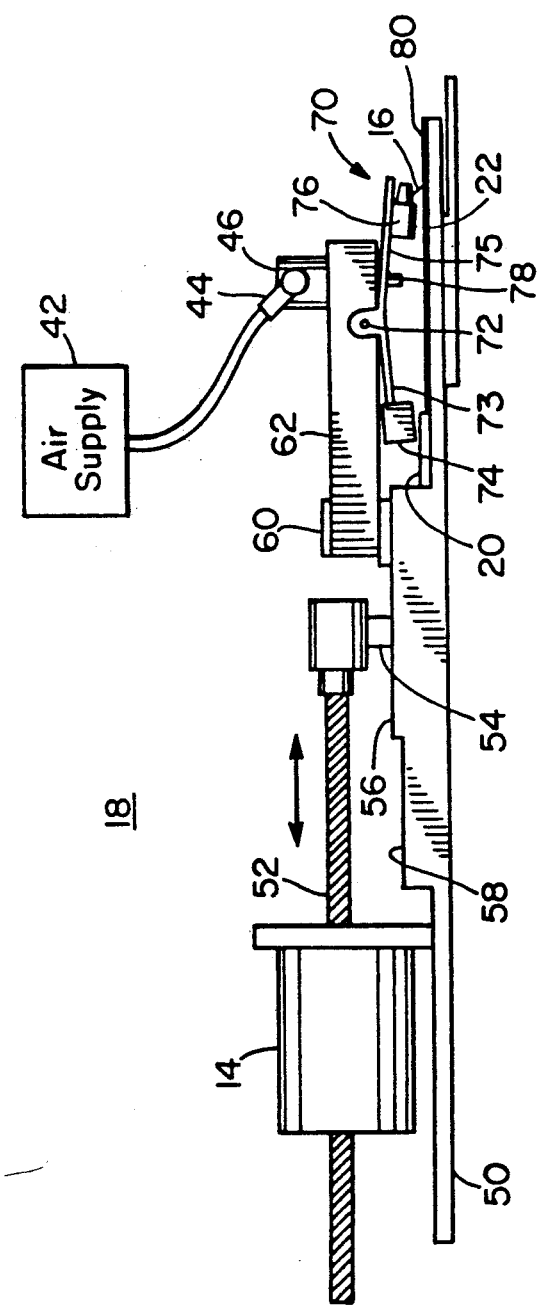

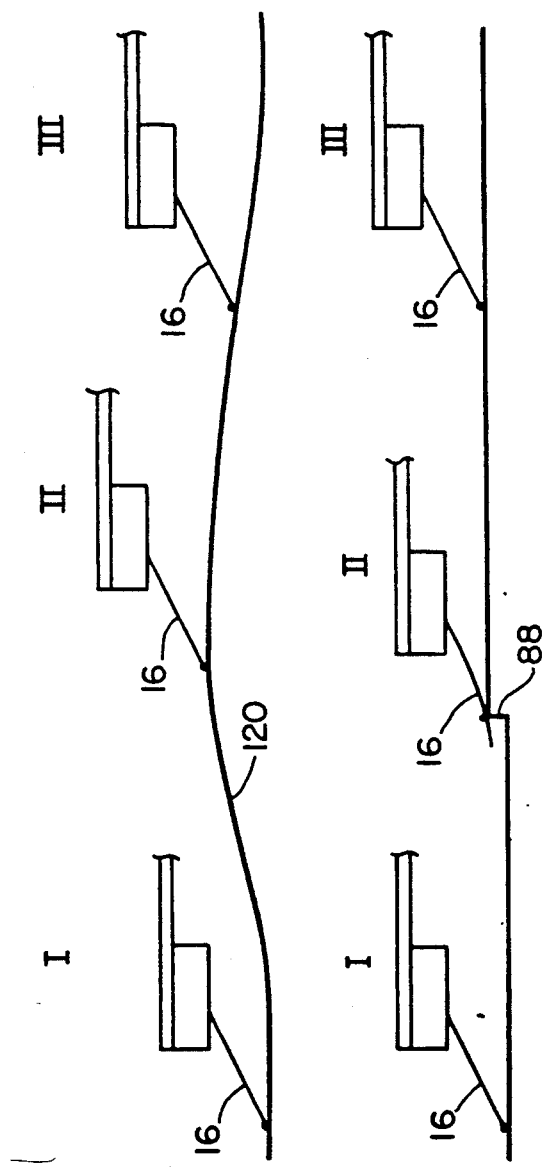
Fig. 5A
Fig. 5B
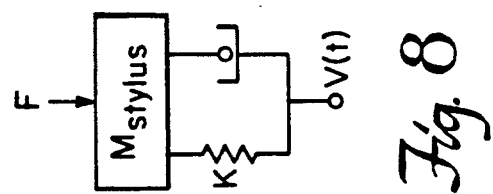
Fig. 8
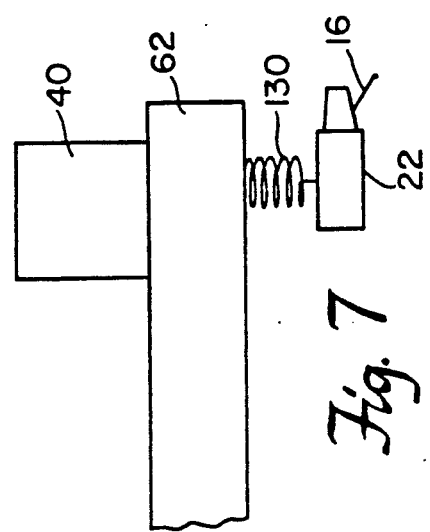
Fig. 7
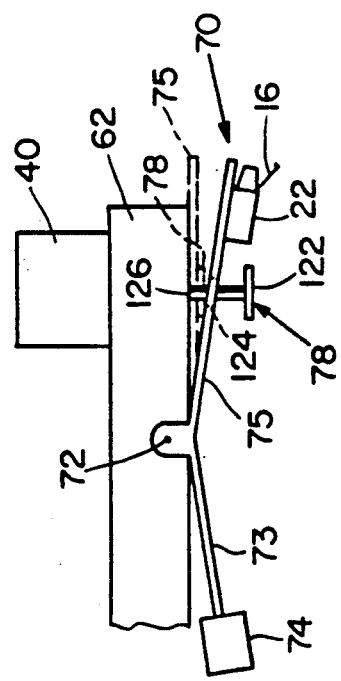
Fig. 6

EDGE DETECTING SYSTEM AND METHOD

FIELD OF INVENTION

This invention relates to an edge detecting system and method for detecting an abrupt edge on a wavy surface and to a system for detecting the orientation of fibers in a material, and more particularly to such systems in which the tactile sensing head virtually floats over the surface and mechanically filters out responses to the wavy contours and accepts responses from high-frequency surface transitions.

BACKGROUND OF INVENTION

There is a great demand for cost effective automated systems for manufacturing structures using advanced composite materials, e.g. thermoplastic composite materials. A cost analysis has shown that the layup of these materials is the most labor-intensive operation. Layup consists of building up ply layers, stacked up in different fiber orientations to give desired mechanical properties. Each distinct layer is created by placing several strips of material next to one another. Accuracy requirements for layup are high, and human inaccuracies result in a high final part reject rate. To decrease human labor content and increase overall quality, automated layup systems are desirable. To accurately place strips of material next to one another, it is necessary to detect the edge of a ply of material. Optical sensors could resolve very small distances and dimensions but are unreliable because of their high sensitivity to surface waviness, a common condition of ply material. In addition, optical sensors normally require sufficient contrast not often present between layers of plies to be assembled and frequently the plies are black or dark in color, further exacerbating the problem for optical sensors.

SUMMARY OF INVENTION

It is therefore an object of this invention to provide an improved system and method for automatically detecting an abrupt edge on a wavy surface.

It is a further object of this invention to provide an improved system and method for automatically detecting the orientation of fibers in material.

It is a further object of this invention to provide such a system and method which employs tactile sensing to locate an edge and determine fiber orientation.

It is a further object of this invention to provide such a system and method which is insensitive to surface waviness.

It is a further object of this invention to provide such a system and method which is extremely accurate and reliable.

It is a further object of this invention to provide such a system and method which detects a ply of nominal 0.005 inch thickness on any surface whether contrasting or not, with a positional accuracy of ±0.001 inch.

It is a further object of this invention to provide such a system and method which employs tactile sensing.

It is further object of this invention to provide such a system and method which virtually floats over the surface.

It is a further object of this invention to provide such a system and method which is simple, inexpensive, and can use off-the-shelf components.

The invention results from the realization that a truly effective, reliable and accurate tactile sensing technique is achieved employing a stylus which is suspended to float over the surface so that low-frequency perturbations, such as from wavy contours, are mechanically filtered out and the stylus response to them virtually eliminated, while the stylus is compelled to respond to higher-frequency transitions such as edges, and from the further realization that the same floating stylus technique can be used to detect the orientation of the fibers in the material of the surface.

This invention features an edge detecting system for detecting an edge on a wavy surface. There is a stylus for tracking across the surface and a transducer responsive to the stylus for producing a signal representative of surface transitions sensed by the stylus. Support means suspend the stylus over the surface with the stylus contacting the surface. The support means has a natural frequency which isolates the stylus from the low-frequency wave surface contours and compels the stylus to respond only to higher frequency surface transitions. There are means responsive to the transducer for detecting a signal representative of an edge amidst other high-frequency surface transitions.

In preferred embodiments the transducer may be an electromechanical transducer and the transducer of the stylus may be components of a phonograph cartridge. Support means may include resilient means for suspending the stylus over the surface. The resilient means may be spring means or they may include a pivoted arm for mounting the stylus on one side of the pivot and a counterweight on the other. The natural frequency of the support means may be 2.5 Hz so that the stylus is kept from responding to the wavy surface contours having a frequency of 0.1–0.01 Hz. The means for detecting may include means for comparing the transition signal with a reference level. The means for detecting may also include means for moving the stylus across the surface where edge detection is sought, and means for halting the stylus motion across the surface when an edge is detected. The transducer may be suspended with the stylus from the support means.

The invention also features a method for detecting an abrupt edge on a wavy surface by drawing a stylus across the surface being searched for edges, generating signals representative of surface transitions sensed by the stylus, filtering pertubations of the stylus from the low-frequency wavy surface contours, and detecting a signal representative of an edge amidst the other high-frequency transitions.

The invention also features a fiber orientation detection system for detecting the orientation of the fibers of material subject to wavy surface contours. There is a stylus for tracking across the material and a transducer responsive to the stylus for producing a signal representative of surface irregularities produced by the fibers. Support means suspend the stylus over the surface with the stylus contacting the material. The support means has a natural frequency which isolates the stylus from the low-frequency wavy surface contours and compels the stylus to respond only to high-frequency surface transitions. There are means for averaging the high-frequency signal representative of surface irregularities produced by the fibers and means for comparing the average signal representative of surface irregularities with a reference level to determine the direction of orientation of the fibers.

The invention also features a method of detecting the orientation of fibers and materials subject to wavy surface contours. A stylus is drawn across the material whose fiber orientation is to be determined, and signals are generated representative of surface irregularities produced by the fibers. Perturbations of the stylus on the low-frequency wavy contours are filtered out and the signal representative of the surface irregularities produced by the fibers is averaged. The average signal representative of the surface irregularities is compared with a reference level to determine the direction of orientation of the fibers.

DISCLOSURE OF PREFERRED EMBODIMENT

Other objects, features and advantages will occur to those skilled in the art from the following description of a preferred embodiment and the accompanying drawings, in which:

FIG. 2 is a schematic side elevational view of the sensor assembly of FIG. 1;

FIG. 3 is a top plan view of the sensor assembly of FIG. 2;

FIGS. 5A and 5B are schematic drawings illustrating the action of the stylus over a wavy surface and over an edge transition, respectively, according to this invention;

FIG. 6 is an enlarged schematic side elevational view of a portion of the sensor assembly shown in FIGS. 2 and 3 illustrating the action of the retaining pin;

FIG. 7 is a view similar to FIG. 6 employing a different resilient means for suspending the stylus;

FIG. 8 is an equivalent circuit for determining the natural frequency of the support means;

The edge detecting system for detecting an abrupt edge on a wavy surface according to this invention may be accomplished using a stylus such as a phonograph needle for tracking across the surface to be monitored. The stylus or needle may form an integral part of a transducer which produces a signal representative of the stylus response to surface transitions. The transducer and stylus or needle may be constituted in a phonograph cartridge. The stylus is suspended over the surface by a resilient support means so that the stylus contacts the surface, but very gently. The support means including the stylus has a natural frequency which isolates the stylus from the low-frequency wavy surface contours and compels the stylus to respond only to higher-frequency surface transitions. Thus over gently undulating low-frequency surfaces, the entire support mechanism moves up and down with the stylus so that the support means absorbs the undulations while the stylus does not. However, when the surface transitions occur at higher frequency the support means does not respond so quickly, while the stylus does, and so the stylus detects the higher-frequency transitions or edges. With the lower-frequency contours thus filtered out, the higher-frequency transitions are compared with a reference level to detect an edge from amongst various other high-frequency surface transitions. The transducer may form a part of the support means whose natural frequency determines the filtering action. The gentle floating action of the support means may be accomplished in a number of ways, e.g., a balanced tone arm with a counterweight, a spring suspension, or the like. The natural frequency of the support means is approximately 2.5 Hz and the wavy contours have a frequency of approximately 0.1–0.01 Hz.

The fiber orientation detection system according to this invention may be accomplished using similar stylus, transducer, and support means to obtain a signal representative of surface irregularities produced by the fibers, and then averaging the high-frequency signal representative of the surface irregularities and comparing that average signal with a reference level to determine the direction of the fibers.

Figure 1:
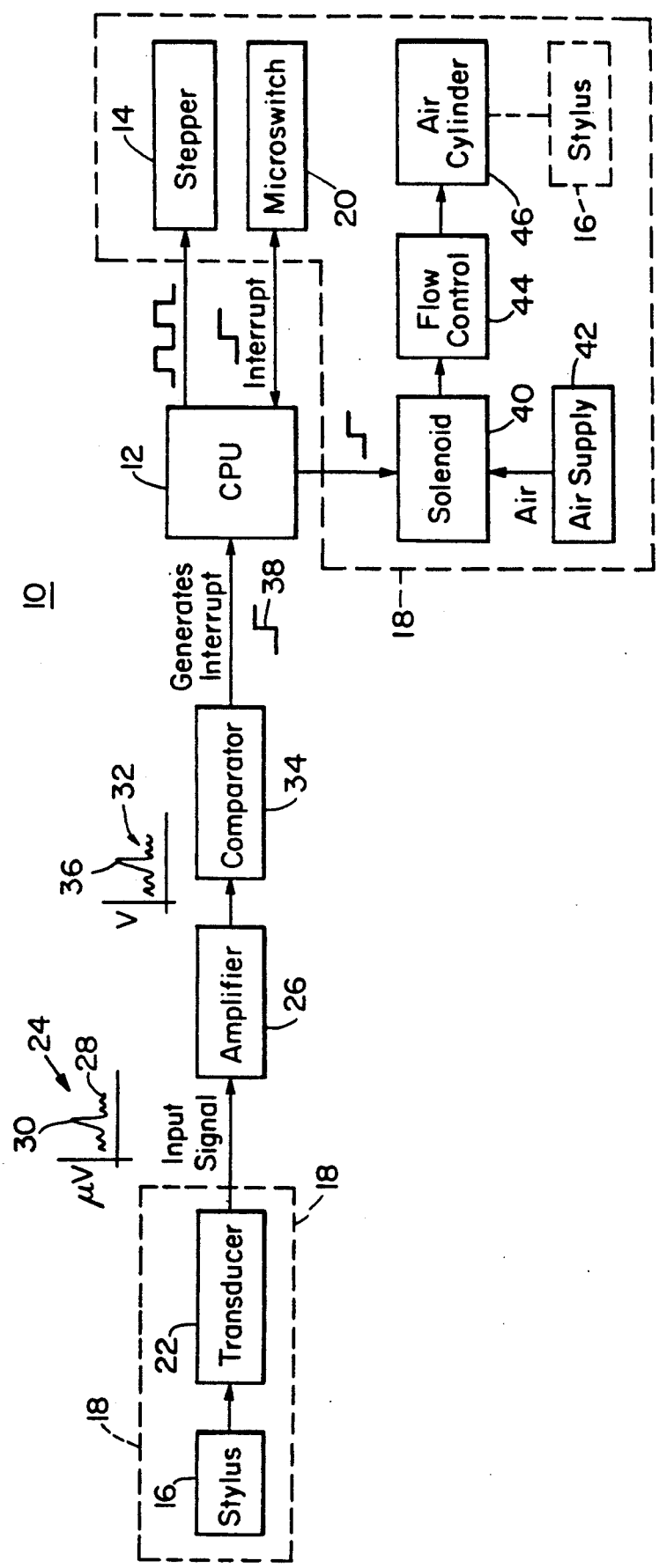
FIG. 1 is a schematic block diagram of an edge detecting system according to this invention.

There is shown FIG. 1 an edge detecting system 10 including a computer processor 12 which provides drive signals to stepper motor 14, which moves stylus 16 in sensor assembly 18 across a surface where an edge is sought to be detected. If stepper motor 14 has driven stylus 16 a predetermined distance, for example four inches, without encountering an edge, microswitch 20 is tripped and provides an interrupt to processor 12 to begin the cycle again. Stylus 16, which may be for example a mechanical needle, is connected to transducer 22. As stylus 16 is drawn across surface, transducer 22 provides an output 24 to amplifier 26. Output 24, measured in microvolts, typically includes a background high-frequency portion 28, and if an edge is detected, a component 30 representing the edge which is much higher in amplitude than portion 20. Amplifier 26 replicates signal 24 at a much higher gain to obtain signal 32, which is delivered to comparator 34. If portion 36 representing an edge is sufficiently high with respect to a reference level, comparator 34 generates an interrupt 38 which is delivered to CPU 12, which in response immediately stops stepper motor 14 and notes the distance traveled as an indication of the position of the edge. Before CPU 12 begins to drive stepper motor 14, it activates solenoid 40 to provide pressurized air from supply 42 through flow control valve 44 to air cylinder 46 to lower stylus 16 to contact with the surface. The flow control valve assures that the decent will be slow and gradual. When microswitch 20 indicates the end of a search, CPU 12 triggers solenoid 40 to reverse the flow to air cylinder 46 and restrict stylus 16.

Sensor assembly 18, FIG. 2, includes a base 50 on which is mounted linear stepping motor 14 that drives worm screw 52 fastened by means of shaft 54 to table 56 which is slidable to and fro on track 58. Bracket 60 mounted of table 56 carries frame 62 which mounts air cylinder 46 and flow control valve 44. A balanced tone arm 70 is pivotally attached at pivot 72 to frame 62. The rear portion 73 of tone arm 70 carries counterweight 74, while the forward portion 75 carries audio cartridge 76 which is an integral combination of transducer 22 and stylus or needle 16.

Air supply 42 typically provides approximately 40 psi and counterweight 74 has a weight of 26 grams in order to counterbalance a blank cartridge, resulting is a downward force on stylus 16 of approximately 1 gram. Microswitch 20, which trips at the end of a search cycle, is mounted on base 50, as are a pair of fingers 80, 82, shown more clearly in FIG. 3, which press down on the two sheets of material 84 and 86, forming the edge 88 which is to be detected. Stepper motor 14 has a resolution of 0.001 inch per step, with a speed of 220 steps per second.

Figure 4:
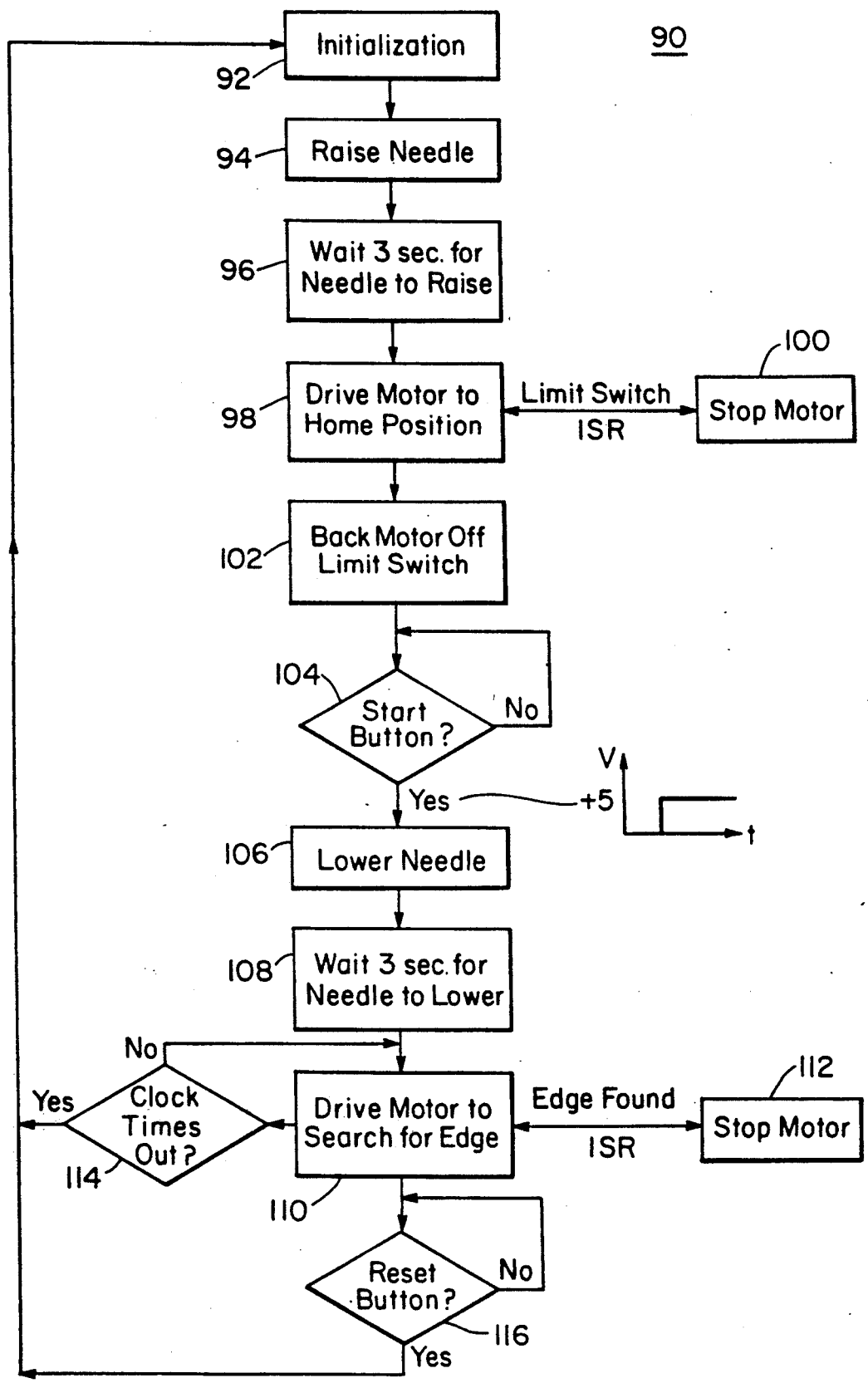
FIG. 4 is a flow chart illustrating the operation of the processor of FIG. 1.

The control function of CPU 12 is illustrated by flow chart 90, FIG. 4. After initialization, step 92, the needle or stylus is raised, step 94, and the system is allowed to settle for three seconds, step 96, to avoid any spurious signals that might occur from the movement of the needle. The stepping motor is then driven to its own position so that the stylus is moved to the full extent of its travel. At this point microswitch 20 is hit and a "stop motor" signal is generated, step 100. Following this in step 102, the motor is operated to back the system off the signal switch. This again is to permit any transience that might occur from the release of the limit switch to settle before the start button is pushed. If the start button is pushed, step 104, the needle is then lowered, step 106, and after a three second delay, step 108, the motor is driven to draw the stylus across the surface in step 110 and search for the edge. If the edge is found, the processor generates a signal to stop the motor in step 112. If no edge is found, eventually the clock times out at step 114 and cycles the system back to the initialization step 92 after the clock is either timed out or an edge has been found. The system can also be reset by operating the start button in step 116.

The mechanical filtering action of this system can be better understood with reference to FIGS. 5A and 5B. In FIG. 5A the travel of the stylus 16 is depicted at three successive positions: I, II and III, as the system tracks over an undulating surface. There it can be seen that the entire suspension system moves up as a unit so that no force or displacement is applied to stylus 16. Therefore, stylus 16 does not see or record or respond to the gentle undulations 120.

In contract, as shown in FIG. 5B, when stylus 16 is drawn across a high-frequency transition or abrupt edge 88, the suspension system does not float up to isolate stylus 16 from the impact. Rather, stylus 16, as shown in FIG. 5B, state II, deflects and creates a signal representative of the encountering to edge 88. It is this mechanical filtering action that permits the system to reliably and accurately detect edges while not being confused by undulations, wavy surfaces or other low-frequency transitions.

The action of retaining pin 78 is demonstrated in FIG. 6. When balanced arm 70 is to be released, solenoid 40 drives pin 78 downward so that its retaining cap 122 is well below the hole 124 in arm portion 75, which accommodates the shaft 126 of retaining pin 78. For retraction, solenoid 40 simply retracts retaining pin 78 so that forward arm portion 75 is drawn up with retaining pin 78 to the position shown in phantom in FIG. 6.

Although thus far the invention has been disclosed employing a balanced arm, this is not a necessary limitation of the invention. For example, stylus 16 may be supported with or without the integral transducer 22 by means of a relatively soft spring 130 having a spring constant such as 8 grams/in which will similarly allow a mechanical filtering of the lower-frequency undulations. The mechanical equivalent of the tone arm 70, FIGS. 2, 3 and 6, or the spring 130 in FIG. 7, is depicted by the equivalent circuit, FIG. 8, where:

M is mass of transducer;
F is downward force supplied by balanced weight (1 gram);
K is the springiness of the needle;
V(t) is the surface input; and
b is frictional effects in the lever arm.

Figure 9:
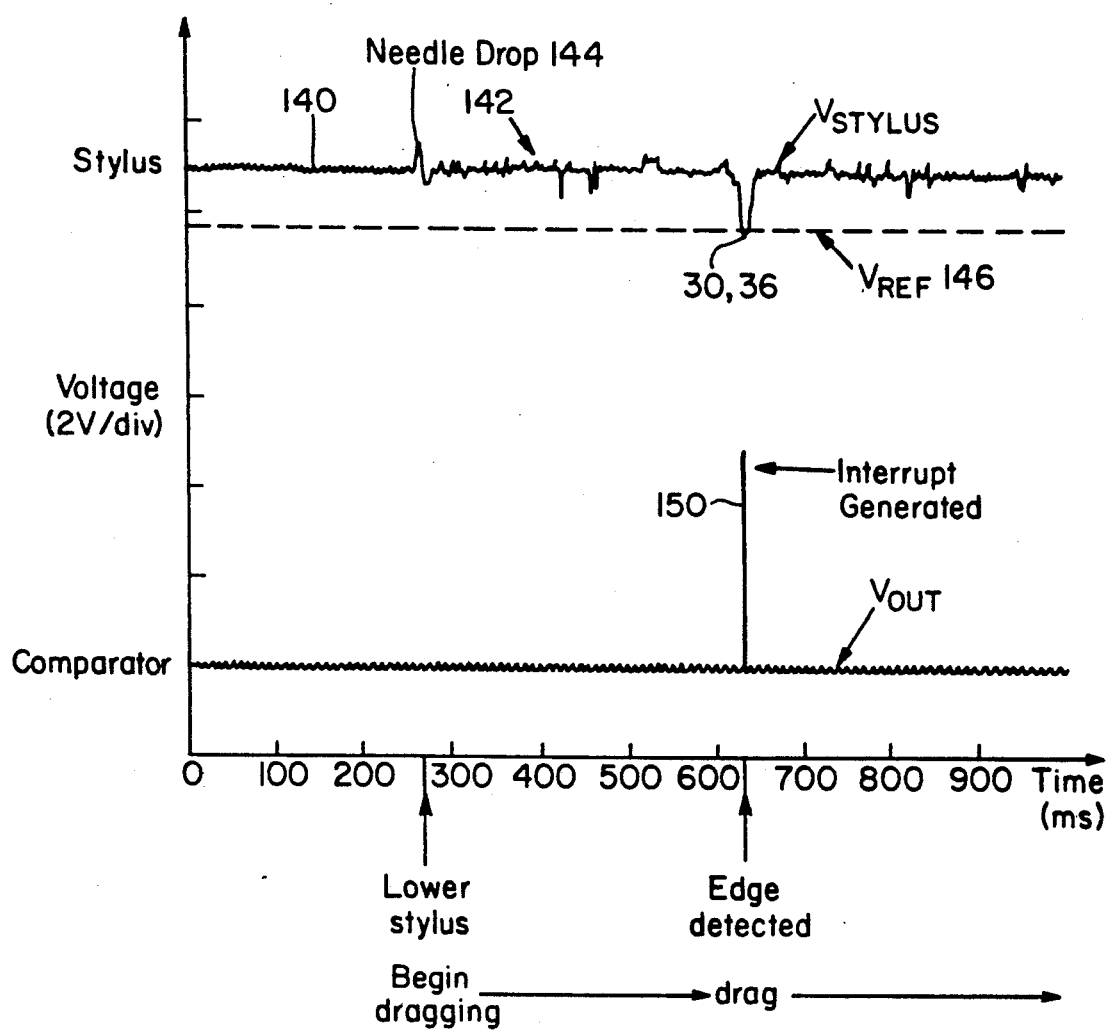
FIG. 9 is a graph illustrating the stylus transducer signal and the signal from the comparator of FIG. 1.

The stylus signal 140, FIG. 9, produced by the transducer and amplified, shows a fairly continuous high-frequency noise signal 142 after the initial excursion 144 produced by the needle drop. Subsequently, when the stylus hits edge 88, a bona fide edge signal 36 occurs which exceeds the reference amplitude level 146. This causes comparator 34 to produce interrupt 150.

Figure 11:
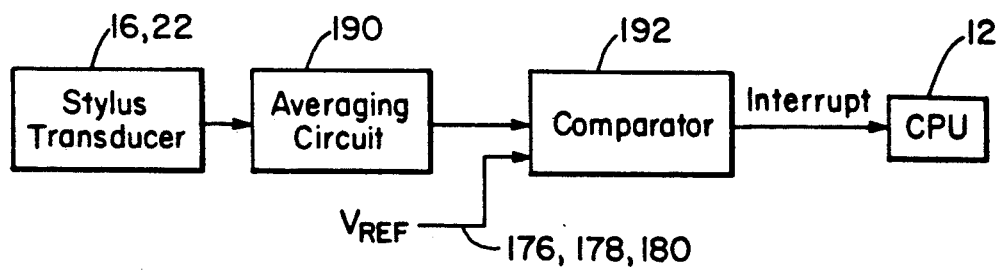
FIG. 11 is a schematic block diagram similar to a portion of FIG. 1 for detecting the orientation of the fibers.
Figure 10:
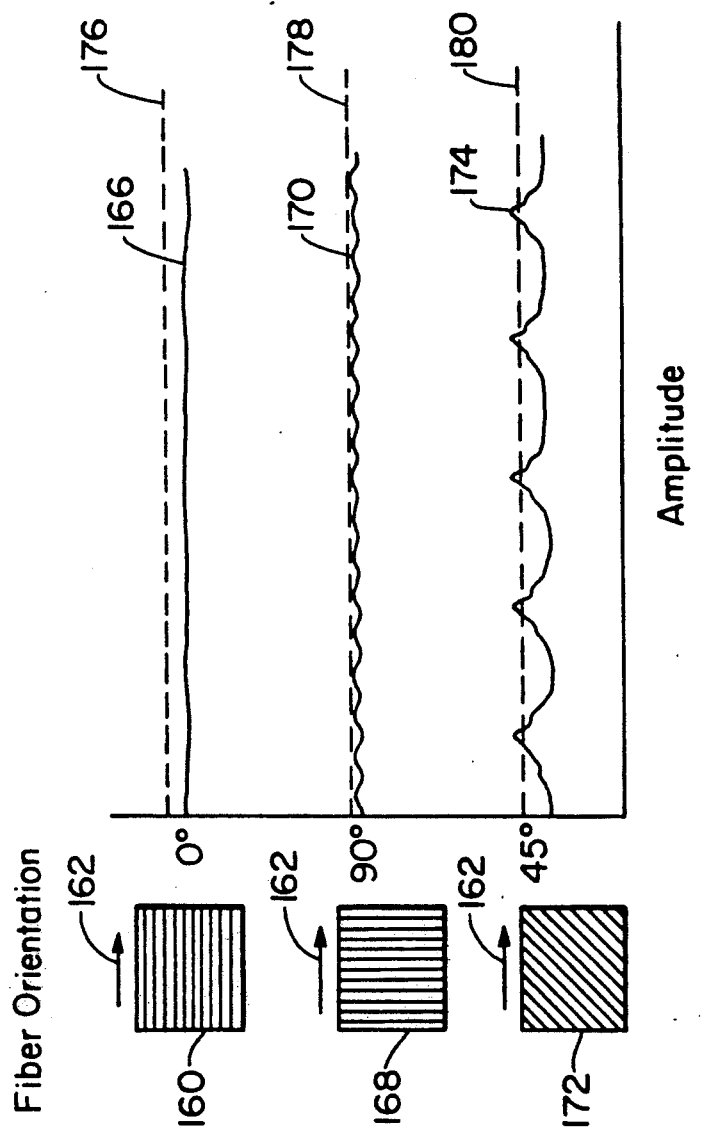
FIG. 10 is a graph illustrating the nature of the signals produced by the stylus in response to tracking across materials having different fiber orientations.

The approach of the mechanically tuned stylus which isolates the stylus from the low-frequency surface undulations is also effective to detect the orientation of the fibers from which the materials are made. That is, the plys whose edges are to be detected are made of generally parallel alignment of fibers in a matrix. In order to properly position the plys it is necessary to determine the orientation of those fibers. It can be observed from FIG. 10 that when stylus 16 is drawn across a piece of material 160 in the direction of arrow 162 parallel to the orientation of the fibers 164, the output signal from stylus 16 is a fairly level and constant value 166. But when the fibers, instead of being at 0° are at 90°, as are fibers 168, then the signal 170 is generated as the needle encounters each of the fibers as it moves along the path 162. Further, if the fibers are oriented at 45°, as are fibers 172, then stylus 16 will provide an output 174 which has much higher peaks and is easily discernible from wave shape 170 for 90° oriented fibers. By carefully setting thresholds 176, 178 and 180, one can detect whether the orientation is closer to 0°, 90° or 45°, and in fact any orientation in between with fairly high resolution. In order to accomplish this the particular signal 166, 170 or 174, FIG. 11, is fed to an averaging circuit 190. The average of those signals is then fed to comparator 192 which compares them to a suitable threshold 176, 178 or 180. If the average signal exceeds the threshold then an is provided to CPU 12, which operates the sensor assembly as previously.

Figure 12:
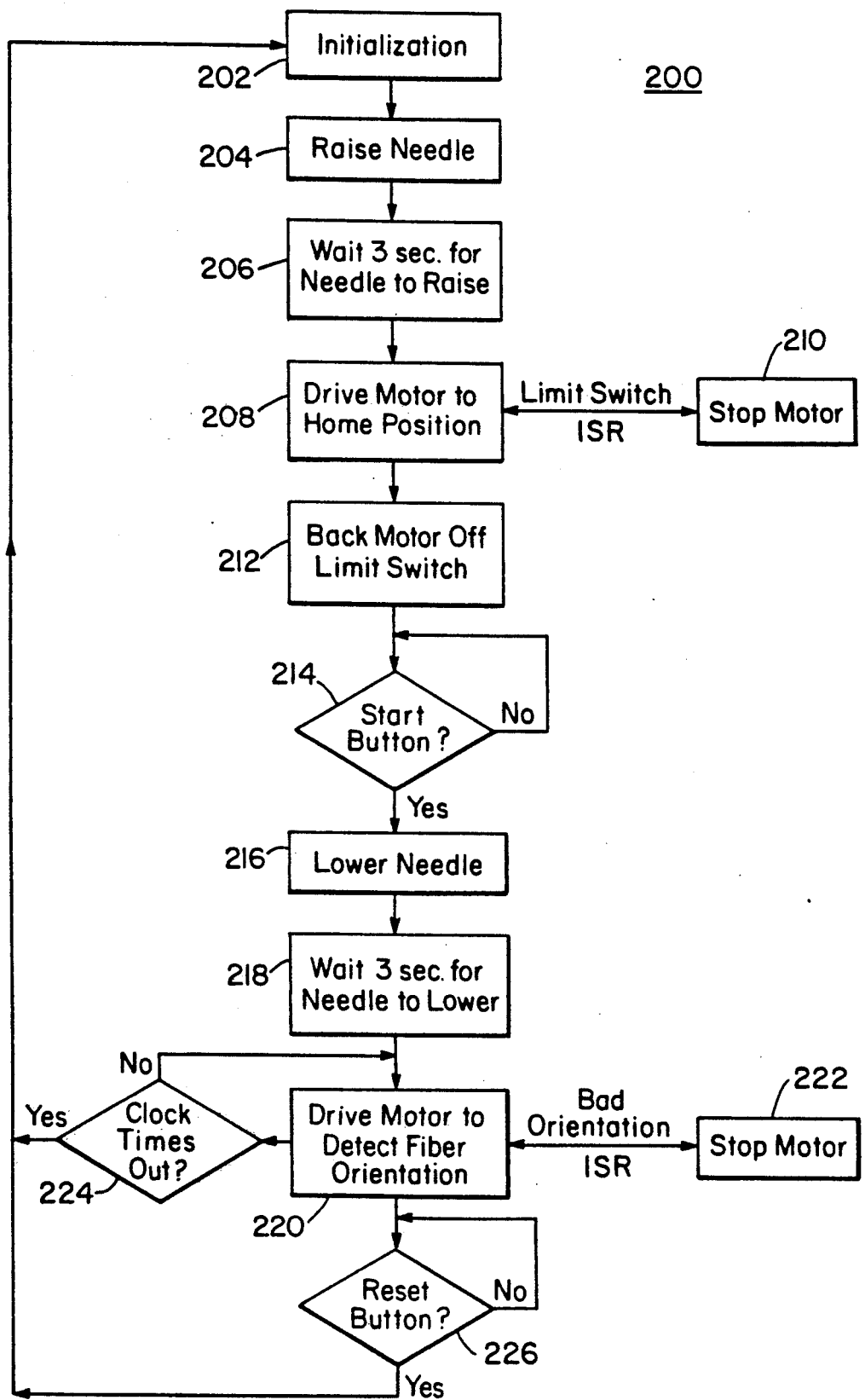
FIG. 12 is a flow chart illustrating the operation of the processor of FIG. 11 for determining the orientation of fibers.

The flow chart of the CPU operation for orientation detection 200, FIG. 12, also begins with initialization, step 202. The needle is raised in step 204 and after a delay of three seconds, step 206 the motor is driven to the home position 208. The limit switch operates motor 210, as previously with respect to FIG. 4, and then the motor is operates in step 212 to back the system off the limit switch. If the start button is pressed, step 214, the needle is lowered in step 216, and after a three-second wait as indicated in step 218, the motor is operated to drive the stylus to search for the fiber orientation in step 220. If a bad orientations found, then the motor is stopped step 222. If the clock times out before the orientation is determined, the system recycles to the initialization step 202. If not, it continues until the orientation is found, after which the system can be reset by operating the button in step 226.

Although specific features of the invention are shown in some drawing and not others, this is for convenience only as each feature may be combined with any or all of the other features in accordance with the invention.

Other embodiments will occur to those skilled in the art and are within the following claims:

What is claimed is:
1. An edge detecting system for detecting an edge on a wavy surface, comprising:
   a stylus for tracking across the surface;
   a transducer, responsive to said stylus, for producing a signal representative of surface transitions sensed by said stylus;

support means for suspending said stylus over said surface with said stylus contacting said surface, said support means having a natural frequency which isolates the stylus from the low-frequency wavy surface contours and compels the stylus to respond only to higher-frequency surface transitions; and means, responsive to said transducer, for detecting a signal component representative of an edge within the higher-frequency surface transitions signal produced by said transducer, including means for moving said stylus across the surface where an edge detection is sought and means for halting said stylus motion across the surface when an edge is detected.

2. The edge detecting system of claim 1 in which said transducer is an electromechanical transducer.

3. The edge detecting system of claim 1 in which said transducer and stylus are components of a phonograph cartridge.

4. The edge detecting system of claim 1 in which said support means includes spring means for suspending said stylus.

5. The edge detecting system of claim 1 in which the natural frequency of said support means is 2.5 Hz.

6. The edge detecting system of claim 1 in which said support means includes a pivoted arm for mounting the stylus on one side of said pivot and a counterweight on the other.

7. The edge detecting system of claim 1 in which said support means includes means for resiliently suspending said stylus over the surface.

8. The edge detecting system of claim 1 in which said means for detecting includes means for comparing said transition signal with a reference level.

9. The edge detecting system of claim 1 in which said transducer is suspended with said stylus from said support means.

10. A fiber orientation detection system for detecting the orientation of the fibers of a material subject to wavy surface contours, comprising:
a stylus for tracking across the material;
a transducer, responsive to said stylus, for producing a high-frequency signal representative of surface irregularities produced by the fibers;
support means for suspending said stylus over said surface with said stylus contacting the material, said support means having a natural frequency which isolates the stylus from the low-frequency wavy surface contours and compels the stylus to respond only to high-frequency surface transitions;
means for averaging the high-frequency signal; and
means for comparing the averaged signal representative of surface irregularities with at least one reference level to determine the orientation of the fibers.

11. The fiber orientation detection system of claim 10 in which said transducer is an electromechanical transducer.

12. The fiber orientation detection system of claim 10 in which said transducer and stylus are components of a phonograph cartridge.

13. The fiber orientation detection system of claim 10 in which said support means includes spring means for suspending said stylus.

14. The fiber orientation detection system of claim 10 in which the natural frequency of said support means is 2.5 Hz.

15. The fiber orientation detection system of claim 10 in which said wavy contours have a frequency of 0.1–0.01 Hz.

16. The fiber orientation detection system of claim 10 in which said support means includes a pivoted arm for mounting the stylus on one side of said pivot and a counterweight on the other.

17. The fiber orientation detection system of claim 10 in which said support means includes means for resiliently suspending said stylus over the surface.

18. The fiber orientation detection system of claim 10 further including means for moving said stylus across the material whose fiber orientation is to be detected.

* * * * *